United States Patent [19]
Ensinger

[11] 3,944,054
[45] Mar. 16, 1976

[54] MODULAR CONVEYOR

[75] Inventor: James L. Ensinger, Mentor, Ohio

[73] Assignee: Power Pack Conveyor Company, Cleveland, Ohio

[22] Filed: Dec. 30, 1974

[21] Appl. No.: 537,080

[52] U.S. Cl. ................. 198/118; 198/139; 198/206
[51] Int. Cl.² .......................................... B65G 11/00
[58] Field of Search ........... 198/113, 117, 118, 139, 198/204, 206

[56] References Cited
UNITED STATES PATENTS

| | | | |
|---|---|---|---|
| 2,794,347 | 6/1957 | York | 198/208 X |
| 2,951,579 | 9/1960 | Stanth et al. | 198/204 |
| 3,605,994 | 9/1971 | Parlette | 198/204 |
| 3,752,298 | 8/1973 | Wenger | 198/204 |

Primary Examiner—Drayton E. Hoffman
Assistant Examiner—Larry H. Martin
Attorney, Agent, or Firm—Baldwin, Egan, Walling & Fetzer

[57] ABSTRACT

A modular conveyor is presented having parallel frame sides which are generally channel shape which are held rigidly in position by a conveyor bottom plate and rigid structures near the opposite ends of the frame fixing the sides in position, one end of the frame having legs removably attached and the other end having legs attached thereto for angular adjustment, a conveyor drive roll at one end of the frame and an idler roll at the opposite end, these rolls being rotatably mounted in a bearing mount which is slidable into one end of the channel shape sides. A power drive is mounted at the end of the frame having the drive roller and the frame may be supported on the legs at both ends for use with the frame and conveyor generally horizontal, or the legs at the one end may be removed and the legs at the other end adjusted to permit the legless end to rest on a supporting surface for use with the conveyor frame inclined. Other features include interfitting plates for assembling two conveyor portions with their longitudinal sides in line and telescopingly secured together to provide one long rigid conveyor frame, interchangeable parts, and roller bearing mounts adapted to slide telescopically in the ends of the channel shape sides.

7 Claims, 14 Drawing Figures

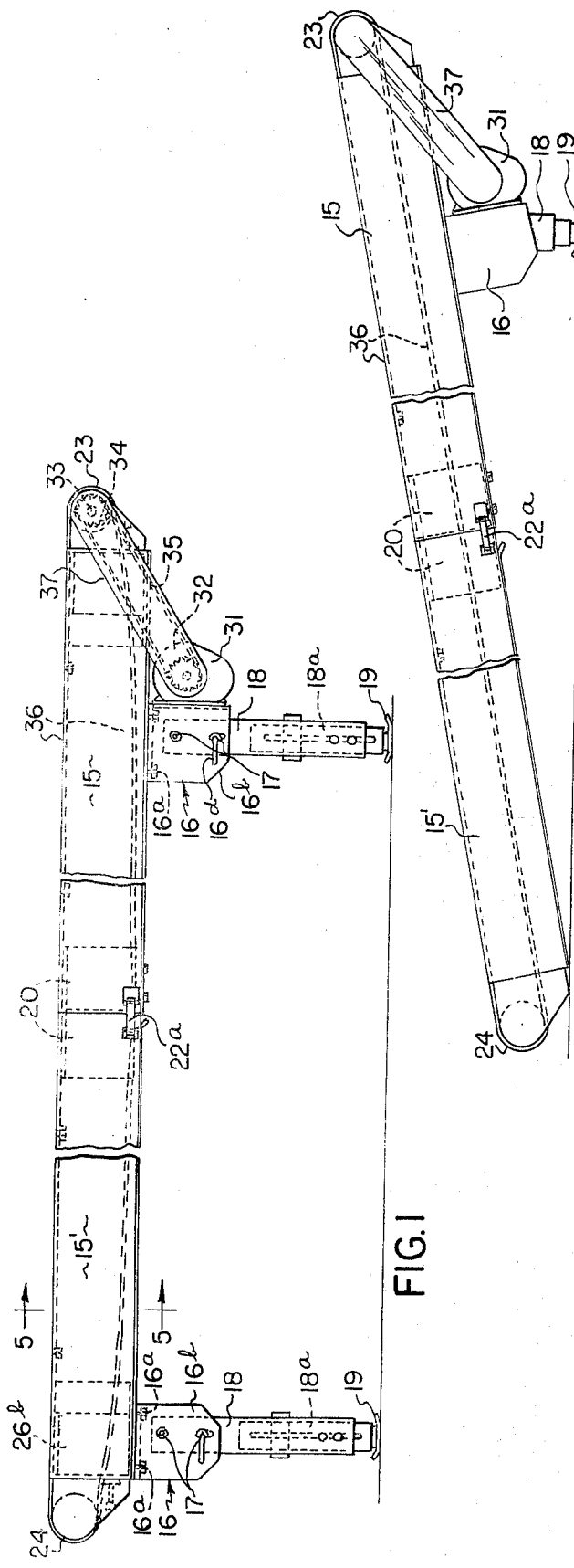
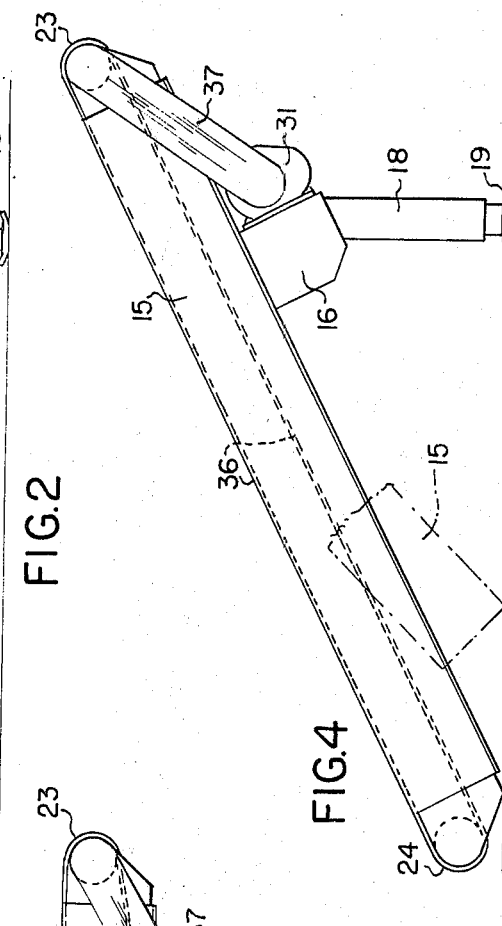
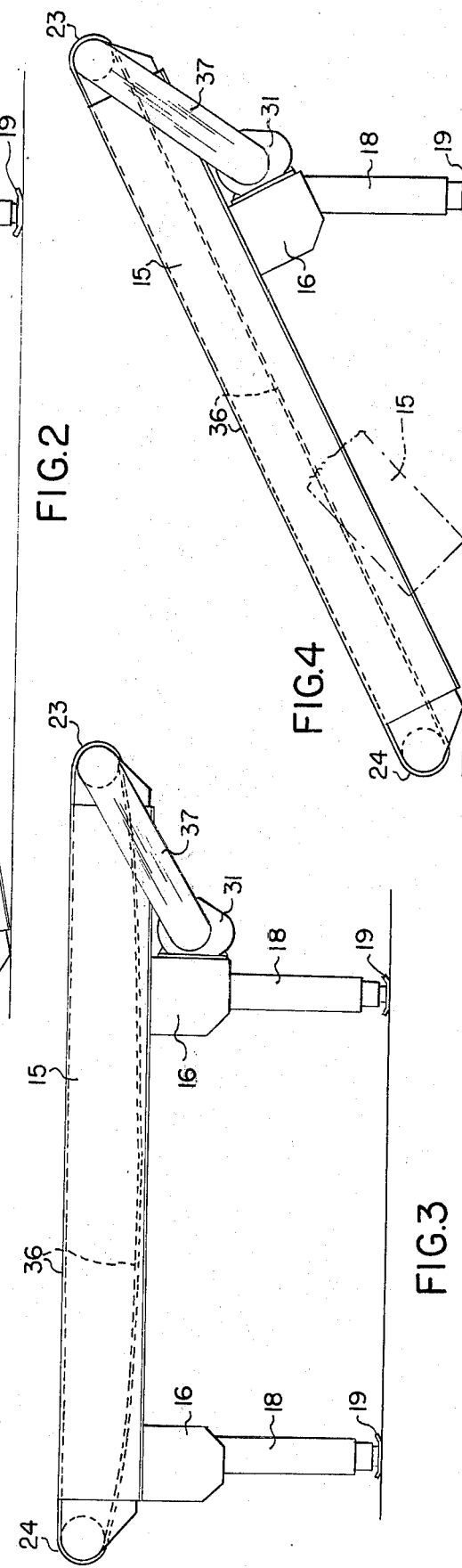
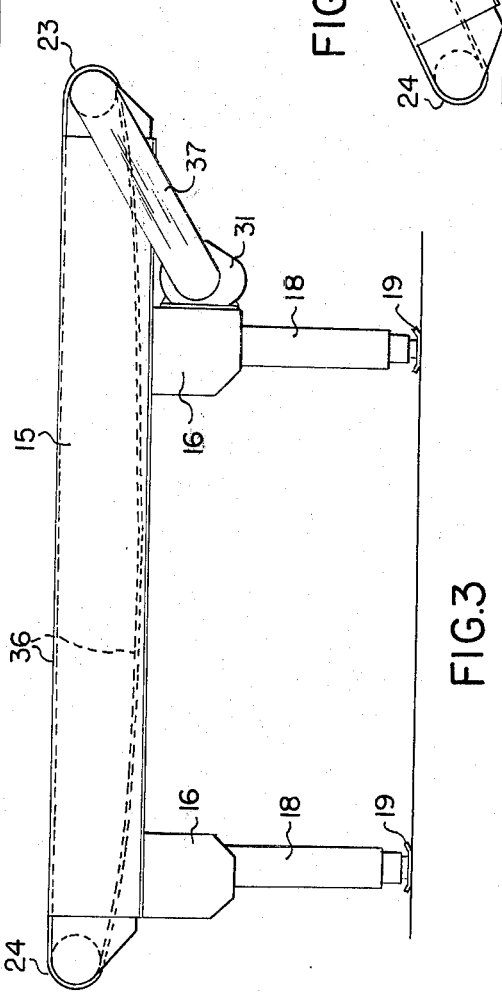

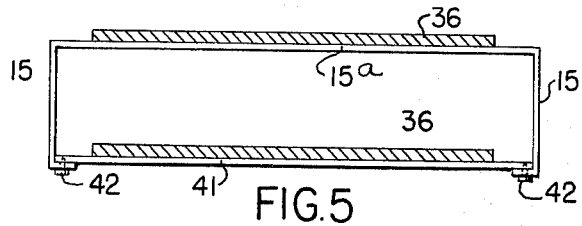
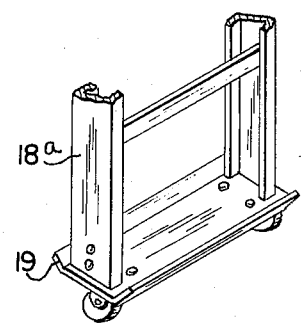
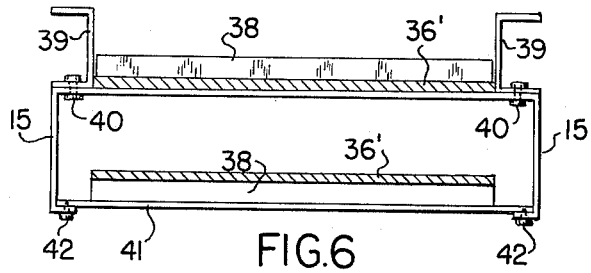
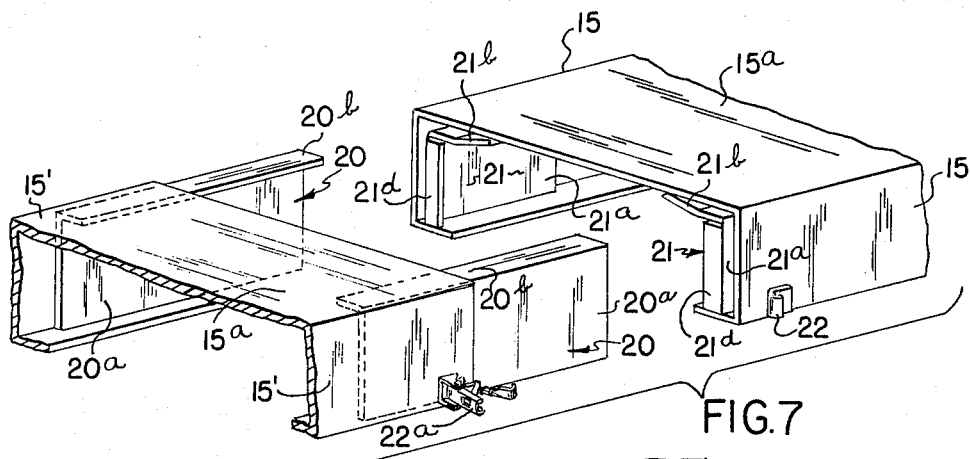
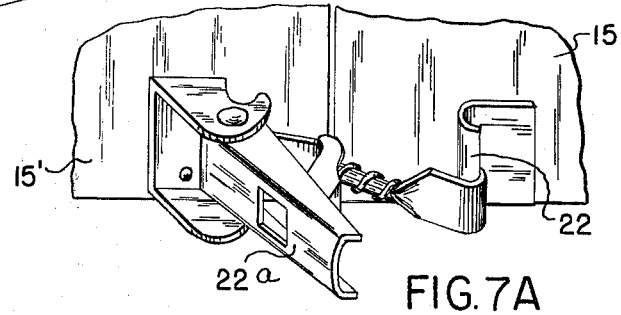
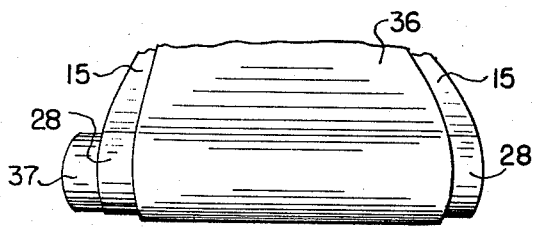

3,944,054

MODULAR CONVEYOR

An object of the present invention is to provide a multi-purpose conveyor having simply designed, easily assembled parts which may form an elevated horizontal conveyor, or an inclined conveyor, the length of the conveyor may be modified as desired, the conveyor belt may be flat or cleated, and all of this is accomplished with a resonable number of parts.

Other objects and advantages of the invention will be set forth in the drawings and specification and the essential features thereof will be set forth in the appended claims. In the drawings, FIG. 1 is a side elevational view of a horizontal conveyor of extended length;

FIG. 2 is a simplified elevational view of the same conveyor with the legs removed at one end so as to provide an inclined conveyor;

FIG. 3 is a simplified elevational view showing how the right-hand portion of FIG. 1 may be assembled to make a shorter elevated horizontal conveyor;

FIG. 4 is a simplified elevational view of the conveyor of FIG. 3 converted to make it inclined;

FIG. 4A shows how a pair of supporting legs may be mounted on wheels;

FIG. 5 is a sectional view, enlarged, taken along the line 5—5 of FIG. 1;

FIG. 6 is a similar sectional view showing a cleated conveyor belt;

FIG. 7 is an enlarged exploded perspective view of the central portion of FIG. 1 showing how two conveyor frame sides are telescopingly fitted together;

FIG. 7A is a further enlarged view of the lock of FIG. 7 which holds the two conveyor side frames together;

FIG. 9A is an end view taken along the line 9A-9A of FIG. 9;

FIG. 10 is a perspective view of the companion plate to receive the splice plate of FIG. 7 or the companion mount to receive the bearing mount in FIGS. 8 and 9; while FIG. 11 is an end view, slightly in perspective, of the drive end of the conveyor when using a flat conveyor belt.

Figure 8:
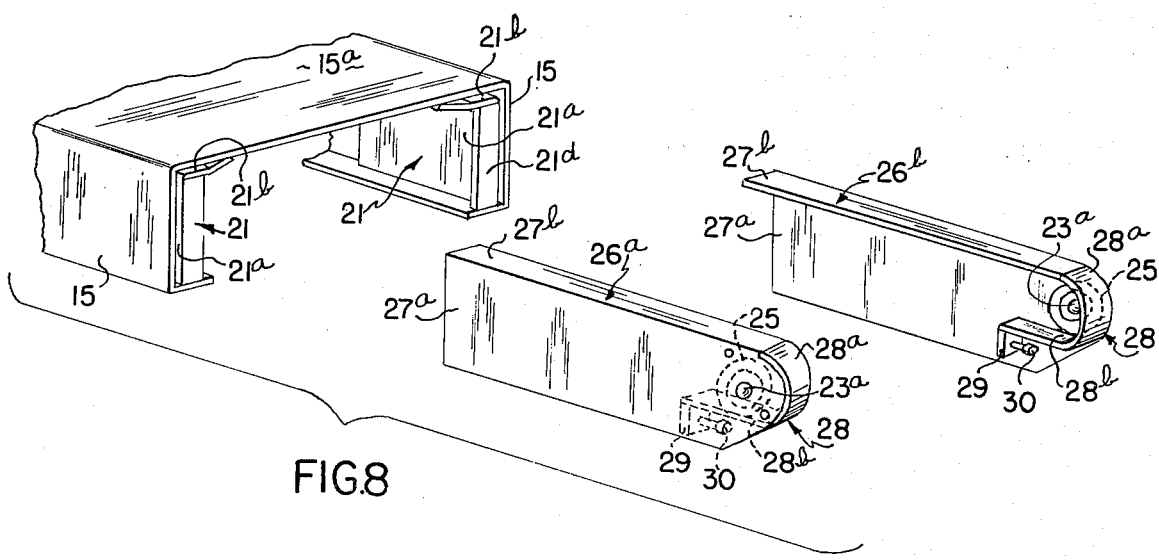
FIG. 8 is an enlarged exploded view illustrating how the bearing mounts are telescopically fitted into the frame side channels.

Referring to FIGS. 1, 5 and 7, the conveyor frame includes longitudinal frame sides 15 which are generally channel shape and which are held in their preferred position as shown in FIG. 5 by a conveyor bottom plate 15a which is shown in the preferred form in FIG. 5 as being integrally a part of the channel sides 15. At opposite ends rigid structure 16 holds the frame sides in position, this structure including a horizontal plate 16a connected to the frame side and having downturned ends 16b which are rigidly connected by bolts 17 to a pair of channel shape legs 18 which preferably have a telescopic extension 18a extending to a supporting foot 19 resting on the floor.

Figures 9A, 10:
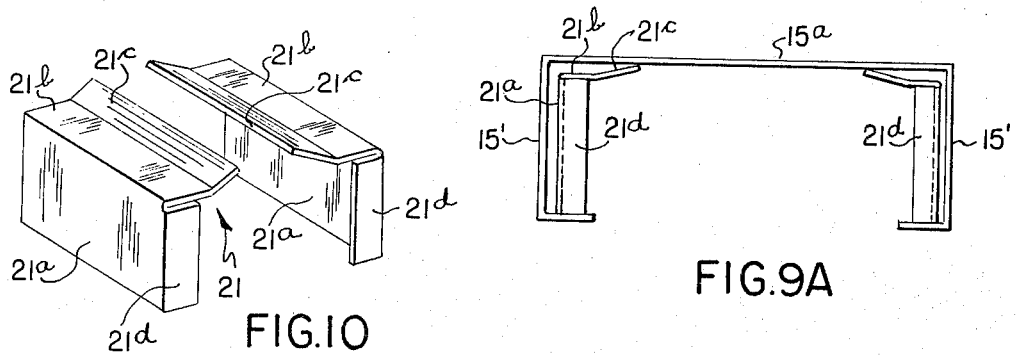

FIG. 1 shows an extended conveyor composed of a righthand portion 15 and a left-hand portion 15'. These two portions are connected by joining means which is best understood from FIG. 7. Here a splice plate 20 on each side of the conveyor has a vertical side 20a of a width to fit snugly in the channel shape of the conveyor portion 15, and having a flange 20b bent inwardly at right angles along its upper edge, this flange fitting snugly beneath the conveyor bottom plate 15a when the parts are moved together from the position shown in FIG. 7. The left ends of splice plates 20 in FIG. 7 are welded to the conveyor frame portions 15' in the position shown in FIG. 7. The interfitting parts include on the right-hand half of FIG. 7 a companion plate 21 on each side having a vertical side plate 21a and a flange 21b are bent inwardly at the top of the vertical side so as to fit snugly in the channel shape sides 15 at the right-hand end of FIG. 7. Preferably the innermost end of the flange 21b is bent up slightly as seen at 21c in FIG. 10 to aid in closely holding the splice plate 20 when the parts are assembled. The exposed outer end of the vertical plate 21a is bent inwardly at right angles as shown at 21d for a purpose later to be described. These companion plates 21 are welded in position in the channel form 15 as shown in FIG. 7. When the two portions 15 and 15' of the conveyor frame are moved together from the position of FIG. 7 to the position of FIG. 1, they are locked together in any suitable manner, as for instance by a toggle lock consisting of a hook 22 on each channel portion 15 coacting with a toggle spring latch 22a rigidly secured to the members 15'. This forms a very rigid joint at the center of the structure as seen in FIG. 1 eliminating substantially all sag in the conveyor sides.

Figure 9:
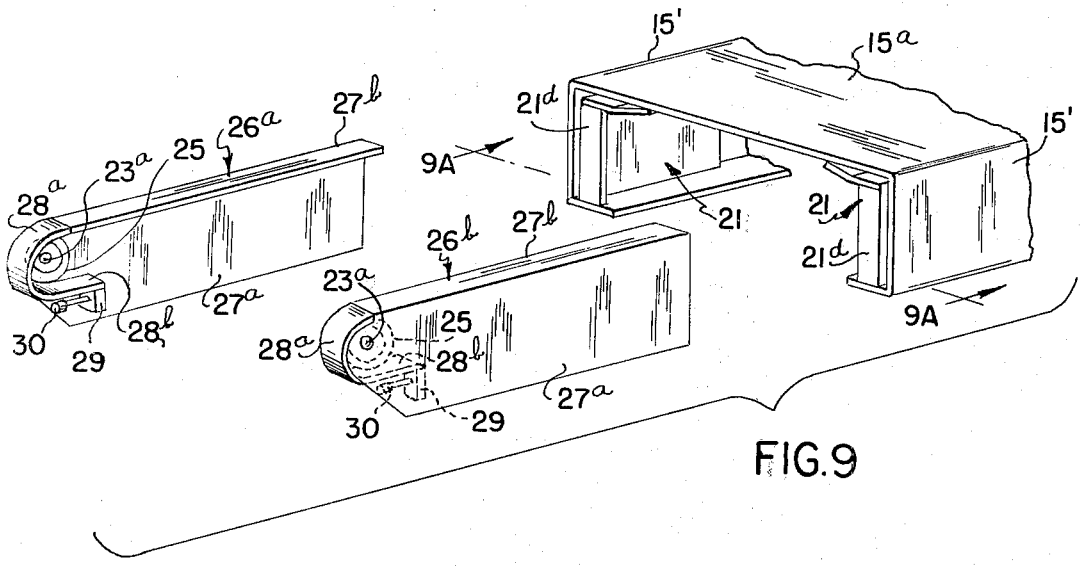
FIG. 9 is a similar view at the other end of the conveyor showing the bearing mounts and the method of assembly at that end.

Special means is provided for mounting a drive roll 23 at one end of the conveyor frame and an idler roll 24 at the other end. This means provides identical supporting parts at each end of the conveyor which simplifies the construction. This is shown in FIGS. 8 and 9. Referring to FIG. 8, the drive roll has a shaft which enters openings 23a in standard bearings 25 which are supported on bearing mounts 26a and 26b. These bearing mounts are exactly the same on one side of the conveyor frame for supporting the drive roll in FIG. 8, or for supporting the idler roll in FIG. 9. The two bearing mounts are identical in shape except that each one bends inwardly toward the other. Each bearing mount has a vertical wall 27a and a top flange 27b bent at right angles to the vertical wall 27a. A companion mount 21 is welded in the right-hand ends of the channel side members 15, flush at the ends, to receive the bearing mounts 26a and 26b as seen in FIG. 8. These companion mounts are identical with the two companion plates 21 described in connection with FIG. 7. Therefore, three right-handed members 21 are made identical and three left-handed members are also identical for this piece. Referring back to FIG. 8, the plates 27a and flanges 27b are proportioned to fit snugly between the vertical plate 21a and the flange 21b and the side channel member 15 and conveyor bottom plate 15a. Each bearing mount has an end cover 28, each of these covers having an arcuate flange 28a at the same radius as the spacing of flange 27b relative to opening 23a of its associated bearing mount, this arcuate flange extending outwardly and downwardly around the associated bearing to a short horizontal plate 28b tangential to the arcuate flange beneath the associated bearing, and each horizontal plate has a threaded nut 29 welded in vertical position at the free end of the plate 28b. Each of these nuts has a threaded take-up screw 30 threaded into it.

The bearing mount structure, and supporting parts, in FIG. 9 are identical with those described in connection with FIG. 8 and have been given the same reference character. It will be noted that the parts 29 and 30 are positioned so that the take-up screw 30 bears against the vertical flange 21b when these parts come into use.

Power means is provided for driving the drive roll 23. This comprises an electrical motor 31 rigidly mounted on the bracket 16 at the right-hand end of FIG. 1 and having a drive sprocket 32. The drive roller has an integral drive shaft 33 which bears a drive sprocket 34. A drive chain 35 passes around the sprockets 32 and 34 so that the motor 31 drives the endless conveyor belt 36 which passes over the rolls 23 and 24. A safety guard 37 completely encloses the drive chain. This conveyor belt retains the bearing mounts at opposite ends of the frame in the assembled position shown in FIG. 1. The take-up screws 30 in FIG. 8 are utilized to take up the tension on the drive chain 35, while the take-up screws 30 of FIG. 9 are used to tension the conveyor belt.

The drawings so far described relate to a conveyor utilizing a flat conveyor belt 36 as shown in FIG. 5. The same structure may be utilized with a cleated belt 36' shown in FIG. 6. In one modification these are 1½ inch high molded cleats on twelve inch centers along the belt, which are seen at 38. When necessary or desirable to hold loose material traveling along the conveyor belt, side guards 39 may be provided which are here shown as out-turned channels bolted at 40 at spaced points along the sides 15 and 15'.

Preferably, a cover plate 41 extends continuously along the underside of the conveyor bolted to the frame sides at 42.

Thus it will be seen that the number of parts necessary for assembling the conveyor in various forms has been reduced by providing three identical members 21 of left-hand construction and three identical members 21 of right-hand construction; two identical bearing mounts 26a are provided for one side of the conveyor and two identical bearing mounts 26b for the other side of the conveyor.

When necessary to change the conveyor of FIG. 1 to the inclined conveyor of FIG. 2, it only necessary to remove the bolts 16c from the left-hand end of FIG. 1 to remove the legs there, and to adjust the angle of the bracket 16 at the righthand end of the conveyor by loosening the bolts 17 there and adjusting the lower bolts 17 in the elongated slot 16d to the desired angle as seen in FIG. 2. To change the conveyor of FIG. 1 to the conveyor of FIG. 3, it is only necessary to remove a section of the conveyor belt 36 or 36', or provide another conveyor belt of the proper length, release the safety latches 22a on both sides of the conveyor, remove the frame sides 15' and take the bearing mounts 26a and 26b containing the idler roll 24 and insert this at the left-hand end of the conveyor sides 15 by inserting the conveyor mounts in the members 21 already in position at the left-hand end of the conveyor side channels 15 as seen in FIG. 7, and then reposition the bracket 16 at the left-hand end of the structure shown in FIG. 3. The change from FIG. 3 to FIG. 4 is like that from FIG. 1 to FIG. 2.

The conveyor has been designed with safety very much in mind. The most obvious safety feature is the clean exterior of the unit. The sides are smooth with no projections which might cause injury to personnel or damage to the product. However, most important is the elimination of pinch points at the head and tail pulleys in which fingers, clothing or product might be caught. This improvement in conveyor design has been accomplished by concealing the head and tail pulleys and by moving the sides as close as possible to the belting, as seen in FIG. 11. And finally, the chain and sprocket drive is totally enclosed.

What is claimed is:

1. A modular conveyor comprising a metal frame having two parallel longitudinal sides, a conveyor bottom plate and rigid means near opposite ends of said frame fixing said sides in said parallel relationship, one of said means having legs removably attached thereto, the other of said means having legs attached thereto for angular adjustment, an idler roll rotatably mounted between said sides at the end having said one means, a drive roll having a shaft rotatably mounted between said sides at the end having said other means, an endless conveyor in said frame and extending around both of said rolls, power drive means mounted on said other means and operatively connected with said drive roll, whereby said frame may be supported on said legs at both ends for use with said frame generally horizontal, or said legs at said one end may be removed and said legs at said other end adjusted to permit said legless end to rest on a supporting surface for use with said frame inclined, said frame sides being each in two aligned portions with means for joining said portions at a meeting point intermediate the ends of said frame, said joining means including interfitting parts on each side telescopingly sliding snugly from each aligned portion into the other aligned portion mutually supporting said joined portions in a rigid frame structure, and means for locking said aligned portions together, and said drive roll and said idler roll being rotatably mounted in bearing mounts identical in section with said interfitting parts and having joining means connecting them identical with said first named joining means, whereby to make possible multiple arrangements for said rolls and said two aligned frame portions using a limited number of parts.

2. A conveyor as defined in claim 1, wherein said frame sides are generally channel shape, said joining means comprises a splice plate on each side having a vertical side of a width to fit snugly in said channel shape and having a flange bent inwardly at its top, said splice plate welded at one end to one of said portions and having a free end extending into said other portion, and said interfitting parts including on each side on said other portion a companion plate having a vertical side and a flange bent inwardly at its top and of a size to fit snugly inside said vertical side and top flange of said splice plate, and said companion plate welded to said other portion.

3. A conveyor as defined in claim 1, wherein said frame sides are generally channel shape, at opposite ends of each side a bearing mount is provided including a vertical side and a top flange bent inwardly, said vertical side and flange of a shape to fit snugly in said channel shape, a roll shaft bearing mounted inside of each mount, a companion mount having a vertical side and a flange bent inwardly at its top and of a size to fit snugly inside said vertical side and top flange of said bearing mount, said companion mount being welded to said frame side channel end in position to receive telescopingly its associated bearing mount, and a bearing mount end cover having an arcuate flange at the same radius as said bearing mount flange and extending thereabout to a short horizontal plate tangential to said arcuate flange beneath said shaft bearing, said end cover welded to said bearing mount.

4. A conveyor as defined in claim 3, wherein said power drive means includes a motor, a sprocket driven thereby, a sprocket on said drive roll shaft, a chain drivingly connecting said sprockets, and at the end of said frame having said drive roll said horizontal plate has a threaded nut welded vertically to its free end, said companion mount has a vertical surface fixed at the outer end of its vertical side at right angles thereto and opposite said nut, and a set screw is threaded into said nut and engages said vertical surface to take up tension on said drive chain.

5. A conveyor as defined in claim 3, wherein at the end of said frame having said idler roll said horizontal plate has a threaded nut welded vertically to its free end, said companion mount has a vertical surface fixed at the outer end of its vertical side at right angles thereto and opposite said nut, and a set screw is threaded into said nut and engages said vertical surface to take up tension on said conveyor belt.

6. A conveyor as defined in claim 1, wherein said frame sides are generally channel shape, said joining means comprises a splice plate on each side having a vertical side of a width to fit snugly in said channel shape and having a flange bent inwardly at its top in position to lie snugly beneath said conveyor bottom plate, said splice plate welded at one end to one of said portions and having a free end extending into said other portion, and said interfitting parts including on each side on said other portion a companion plate having a vertical side and a flange bent inwardly at its top and of a size to fit snugly inside said vertical side and top flanges of said splice plate, and said companion plate welded to said other portion, said frame sides being generally channel shape, at opposite ends of each side a bearing mount is provided including a vertical side and a top flange bent inwardly, said vertical side and flange of a shape to fit snugly in said channel shape, a roll shaft bearing mounted inside of each mount, a companion mount having a vertical side and a flange bent inwardly at its top and of a size to fit snugly inside said vertical side and top flange of said bearing mount, said companion mount being welded to said frame side channel end in position to receive telescopingly its associated bearing mount.

7. A conveyor as defined in claim 6, wherein each bearing mount has an end cover having an arcuate flange at the same radius as the spacing of said bearing mount flange relative to the bearing center and extending thereabout to a distal short horizontal plate tangential to said arcuate flange beneath said shaft bearing, said end cover welded to said bearing mount, and said companion plate and said companion mount on the same side of said frame being identical.

* * * * *